US012488730B2

(12) United States Patent
Han et al.

(10) Patent No.: US 12,488,730 B2
(45) Date of Patent: Dec. 2, 2025

(54) DISPLAY DEVICE AND DRIVING METHOD THEREOF

(71) Applicant: LG Display Co., Ltd., Seoul (KR)

(72) Inventors: Jeongsoo Han, Paju-si (KR); Jinsol Choi, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 99 days.

(21) Appl. No.: 18/509,867

(22) Filed: Nov. 15, 2023

(65) Prior Publication Data

US 2024/0257706 A1 Aug. 1, 2024

(30) Foreign Application Priority Data

Jan. 31, 2023 (KR) ........................ 10-2023-0012673

(51) Int. Cl.
*G09G 3/20* (2006.01)
*G09G 3/3233* (2016.01)
*G09G 3/3275* (2016.01)

(52) U.S. Cl.
CPC ......... *G09G 3/2096* (2013.01); *G09G 3/3233* (2013.01); *G09G 3/3275* (2013.01); *G09G 2300/0842* (2013.01); *G09G 2310/0262* (2013.01); *G09G 2310/0286* (2013.01); *G09G 2310/0291* (2013.01); *G09G 2310/0297* (2013.01); *G09G 2320/0233* (2013.01); *G09G 2320/045* (2013.01)

(58) Field of Classification Search
CPC .. G09G 3/2096; G09G 3/3233; G09G 3/3275; G09G 2300/0842; G09G 2310/0262; G09G 2310/0286; G09G 2310/0291; G09G 2310/0297; G09G 2320/0233; G09G 2320/045
See application file for complete search history.

(56) References Cited

U.S. PATENT DOCUMENTS

| | | | | |
|---|---|---|---|---|
| 7,136,036 | B2 | 11/2006 | O'Donnell | |
| 7,782,285 | B2 | 8/2010 | O'Donnell | |
| 11,727,888 | B2 * | 8/2023 | Jeong | G09G 3/3233 345/156 |
| 2003/0020724 | A1 | 1/2003 | O'Donnell | |
| 2004/0036665 | A1 | 2/2004 | O'Donnell | |
| 2019/0088230 | A1 * | 3/2019 | Kim | G09G 3/3614 |
| 2023/0047875 | A1 * | 2/2023 | An | G09G 3/2096 |

FOREIGN PATENT DOCUMENTS

KR 10-2002-0093798 A 12/2002

* cited by examiner

*Primary Examiner* — Kenneth B Lee, Jr.
(74) *Attorney, Agent, or Firm* — Fenwick & West LLP

(57) ABSTRACT

Embodiments relate to a display device and driving method thereof. A display device includes a display panel including a sub-pixel, a data driver including a driving circuitry configured to output data voltage to the sub-pixel and a sensing circuitry configured to sense a characteristic of the sub-pixel, and a timing controller configured to determine a compensation value of video data based on the sensed characteristic and corrects the compensation value based on sensing of an output data voltage of the driving circuitry.

24 Claims, 9 Drawing Sheets

DISPLAY DEVICE AND DRIVING METHOD THEREOF

CROSS REFERENCE TO RELATED APPLICATION

The present application claims priority to Republic of Korea Patent Application No. 10-2023-0012673, filed on Jan. 31, 2023, which is hereby incorporated by reference in its entirety.

BACKGROUND

Field

The present disclosure relates to a display device and driving method thereof.

Description of the Related Art

Recently, display devices utilizing self-emitting organic light-emitting diodes (OLEDs) have been gaining attention due to their advantages such as fast response time, high luminous efficiency, brightness, and wide viewing angles.

These display devices array sub-pixels, comprising of organic light-emitting diodes (OLEDs) and driving transistors, in a matrix form on the display panel and control the brightness of sub-pixels selected through scan signals based on the gradation of the data.

SUMMARY

Embodiments provide display devices and driving methods thereof that are capable of solving the problem of image quality degradation and image retention caused by insufficient compensation due to the failure of reaching the target data voltage for video data.

In one embodiment, a display device comprises: a display panel comprising a sub-pixel; a data driver comprising a driving circuitry configured to output a data voltage to the sub-pixel and a sensing circuitry configured to sense a characteristic of the sub-pixel; and a timing controller configured to determine a compensation value for video data based on the sensed characteristic of the sub-pixel, wherein the timing controller senses an output data voltage of the driving circuitry corresponding to the compensated video data that is compensated with the compensation value via the sensing circuitry, and corrects the compensation value based on the sensed output data voltage.

In one embodiment, a driving method of a display device including a display panel including a sub-pixel and a data driver including a driving circuitry configured to output data voltage to the sub-pixel and a sensing circuitry configured to sense a characteristic of the sub-pixel, the driving method comprising: determining a compensation value of video data based on sensing of a characteristic of the sub-pixel; sensing a data voltage output by the driving circuitry via the sensing circuitry, the outputted data voltage compensated using the compensation value; and correcting the compensation value based on the sensed output data voltage.

In one embodiment, a display device comprises: a display panel comprising a sub-pixel; a data driver comprising a driving circuitry configured to output data voltages corresponding to video data to the sub-pixel and a sensing circuitry configured to sense a characteristic of the sub-pixel, the output data voltages including first output data voltages associated with a linear characteristic of the output data voltages and second output data voltages associated with a non-linear characteristic of the output data voltages; and a timing controller configured to determine a compensation value for the video data based on the sensed characteristic of the sub-pixel, wherein the timing controller senses an output data voltage output by the data driver and corrects the compensation value responsive to the output data voltage being included in the second output voltages associated with a non-linear characteristic of the output voltages.

DETAILED DESCRIPTION

Figure 1:
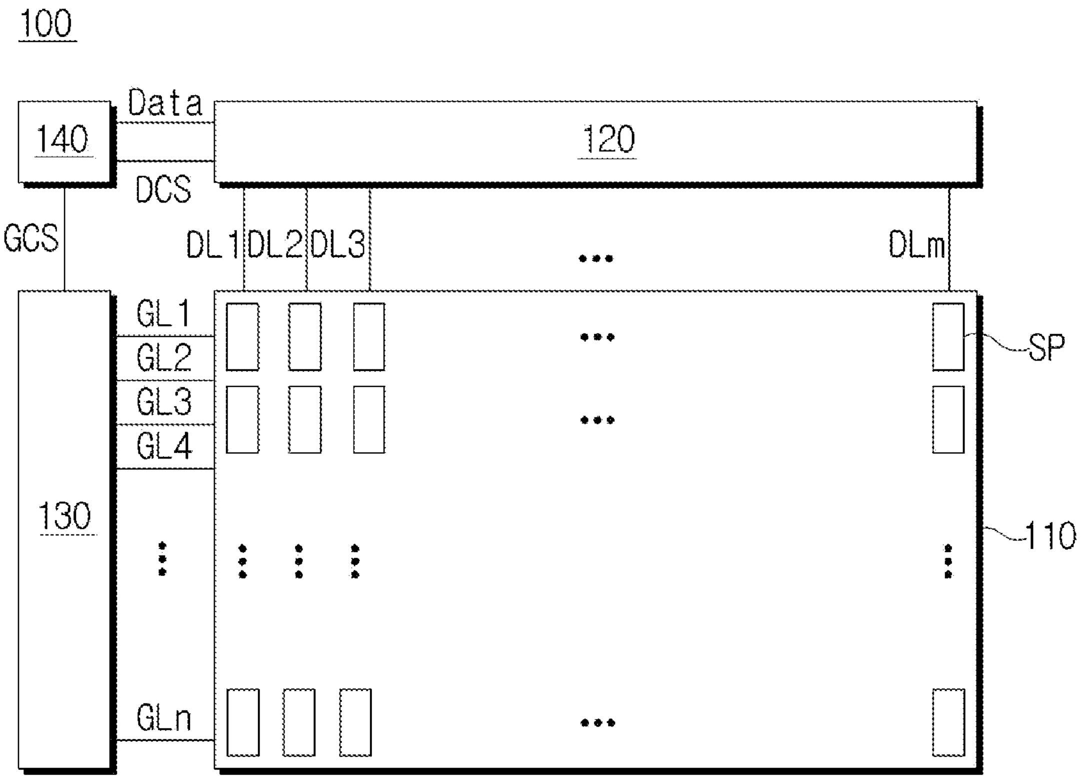
FIG. 1 is a diagram illustrating a system configuration of a display device according to an embodiment.

Hereinafter, embodiments will be described with reference to accompanying drawings. In the specification, when a component (or area, layer, part, etc.) is mentioned as being "on top of," "connected to," or "coupled to" another component, it means that it may be directly connected/coupled to the other component, or a third component may be placed between them.

The same reference numerals refer to the same components. In addition, in the drawings, the thickness, proportions, and dimensions of the components are exaggerated for effective description of the technical content. The expression "and/or" is taken to include one or more combinations that can be defined by associated components.

The terms "first," "second," etc. are used to describe various components, but the components should not be limited by these terms. The terms are used only for distinguishing one component from another component. For example, a first component may be referred to as a second component and, similarly, the second component may be referred to as the first component, without departing from the scope of the present disclosure. As used herein, the singular forms are intended to include the plural forms as well, unless the context clearly indicates otherwise.

The terms such as "below," "lower," "above," "upper," etc. are used to describe the relationship of components depicted in the drawings. The terms are relative concepts and are described based on the direction indicated on the drawing.

It will be further understood that the terms "comprises," "has," and the like are intended to specify the presence of stated features, numbers, steps, operations, components, parts, or a combination thereof but are not intended to preclude the presence or possibility of one or more other features, numbers, steps, operations, components, parts, or combinations thereof.

FIG. 1 is a diagram illustrating a system configuration of a display device 100 according to an embodiment.

With reference to FIG. 1, the display device 100 according to an embodiment includes a display panel 110 including a plurality of sub-pixels SP defined by a plurality of data lines DL1 to DLm and a plurality of gate lines GL1 to GLn arranged thereon in the form of a matrix, a data driver 120 driving the plurality of data lines DL1 to DLm, a gate driver 130 driving the plurality of gate lines GL1 to GLn, and a timing controller 140 controlling the data driver 120 and gate driver 130.

The timing controller 140 supplies various control signals to the data driver 120 and gate driver 130 to control the data driver 120 and gate driver 130.

The timing controller 140 initiates scanning based on the timing implemented in each frame, converts the input video data received from external sources into the data signal format used by the data driver 120, outputs the converted video data Data, and controls the data driving at appropriate times synchronized with the scanning.

The data driver 120 drives the plurality of data lines DL1 to DLm by supplying data voltages to the plurality of data lines DL1 to DLm. The data driver 120 is also referred to as the "source driver." The data driver 120 may include at least one source driver integrated circuit SDIC to drive the plurality of data lines DL1 to DLm.

The gate driver 130 sequentially supplies scanning signals to the plurality of gate lines GL1 to GLn, thereby sequentially driving the gate lines. The gate driver 130 is also known as the "scan driver." The gate driver 130 may include at least one gate driver integrated circuit GDIC to drive a plurality of gate lines GL1 to GLn.

Under the control of the timing controller 140, the gate driver 130 supplies scanning signals of on or off voltages to the plurality of gate lines GL1 to GLn in a sequential manner.

When a specific gate line is opened by the gate driver 130, the data driver 120 converts the received video data, which is in digital form, into analog data voltages and supplies the analog data voltages to the plurality of data lines DL1 to DLm.

Although the data driver 120 is positioned on only one side (e.g., top or bottom) in FIG. 1, it may also be positioned on both sides (e.g., top and bottom) of the display panel 110, depending on the driving method and panel design.

Although the gate driver 130 is positioned on one side (e.g., left or right) of the display panel 110 in FIG. 1, it may also be positioned on both sides (e.g., left and right) of the display panel 110 depending on the driving method and panel design.

The timing controller 140 receives various timing signals including vertical synchronization signals, horizontal synchronization signals, input data enable signals, and clock signals from an external source (e.g., host system), along with input video data.

To control the data driver 120 and gate driver 130, the timing controller 140 generates various control signals based on the timing signals such as vertical sync signals, horizontal sync signals, input data enable (DE) signals, and clock signals, and outputs the generated signals to the data driver 120 and gate driver 130.

For example, the timing controller 140 outputs various gate control signals GCS including gate start pulse, gate shift clock, and gate output enable signals to control the gate driver 130.

The timing controller 140 also outputs various data control signals DCS including source start pulse, source sampling clock, and source output enable signals to control the data driver 120.

Each sub-pixel SP arranged on the display panel 110 may be composed of circuit components such as transistors. For example, each sub-pixel SP may be composed of circuit components such as an organic light-emitting diode OLED and a driving transistor for driving the organic light-emitting diode OLED. The types and quantities of circuit components constituting each sub-pixel SP may vary depending on the desired functions and design approach.

Figure 2:
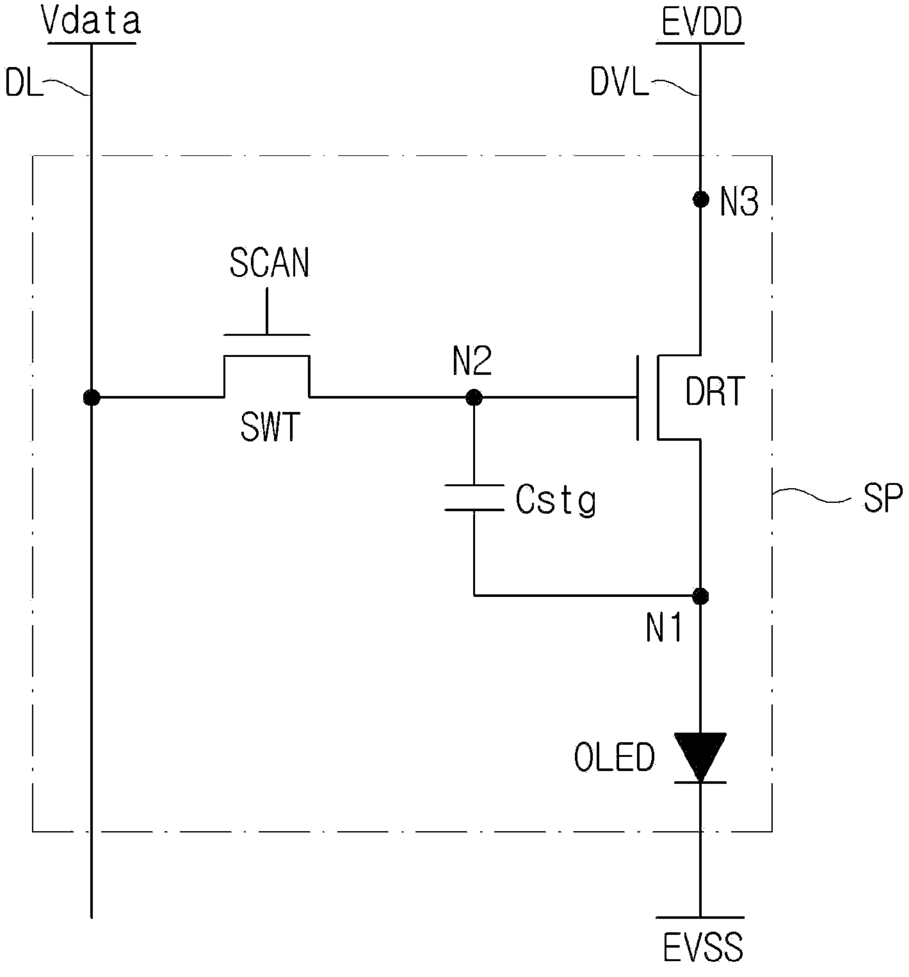
FIG. 2 is a schematic diagram illustrating a sub-pixel of a display device according to an embodiment.

FIG. 2 is a schematic diagram illustrating a configuration of a sub-pixel SP of a display device 100 according to an embodiment.

With reference to FIG. 2, each sub-pixel of the display device 100 according to an embodiment may be configured to basically include an organic light emitting diode OLED, a driving transistor DRT that controls driving current applied to the organic light emitting diode OLED, a switching transistor SWT that transfers data voltage to the gate node of the driving transistor DRT, and a storage capacitor Cstg that maintains the data voltage corresponding to the video signal voltage or the corresponding voltage for one frame duration.

The organic light emitting diode OLED may include a first electrode (e.g., anode electrode), an organic layer, and a second electrode (e.g., cathode electrode).

The driving transistor DRT drives the organic light-emitting diode OLED by supplying driving current to the organic light-emitting diode OLED. The first node N1 of the driving transistor DRT may be electrically connected to the first electrode of the organic light-emitting diode OLED and may be the source node or the drain node. The second node N2 may be electrically connected to the source node or the drain node of the switching transistor SWT and may be the gate node. The third node N3 may be electrically connected to the driving power line DVL supplying a high-potential driving voltage EVDD and may be the drain node or the source node.

The switching transistor SWT is electrically connected between the data line DL and the second node N2 of the driving transistor DRT and may be controlled by a scan signal SCAN applied at the gate node thereof. The switching transistor SWT is turned on by the scan signal SCAN and may transmit the data voltage Vdata supplied through the data line DL to the second node N2 of the driving transistor DRT.

The storage capacitor Cst may be electrically connected between the first node N1 and the second node N2 of the driving transistor DRT. The storage capacitor Cstg is an external capacitor intentionally designed outside the driving transistor DRT rather than an internal capacitor such as a parasitic capacitor existing between the first node N1 and the second node N2 of the driving transistor DRT.

Meanwhile, in a display device 100 according to an embodiment, as the drive time of the sub-pixel SP increases, the circuit components such as organic light-emitting diodes OLED and the driving transistor DRT may degrade. As a result, the intrinsic characteristic values of the circuit components may change. These characteristic values may include the threshold voltage and mobility of the driving transistor DRT and the threshold voltage of the organic light-emitting diode OLED. Such changes in the characteristic values of the circuit components lead to variations in the luminance of the corresponding sub-pixels, causing a decrease in the uniformity of brightness in the display panel 110 and deteriorating image quality.

The display device 100 according to an embodiment may provide sensing functionality to sense the characteristic values or changes in the characteristic values of the circuit components and compensation functionality to compensate for the characteristic value deviations between circuit components based on the sensing results.

Figure 3:
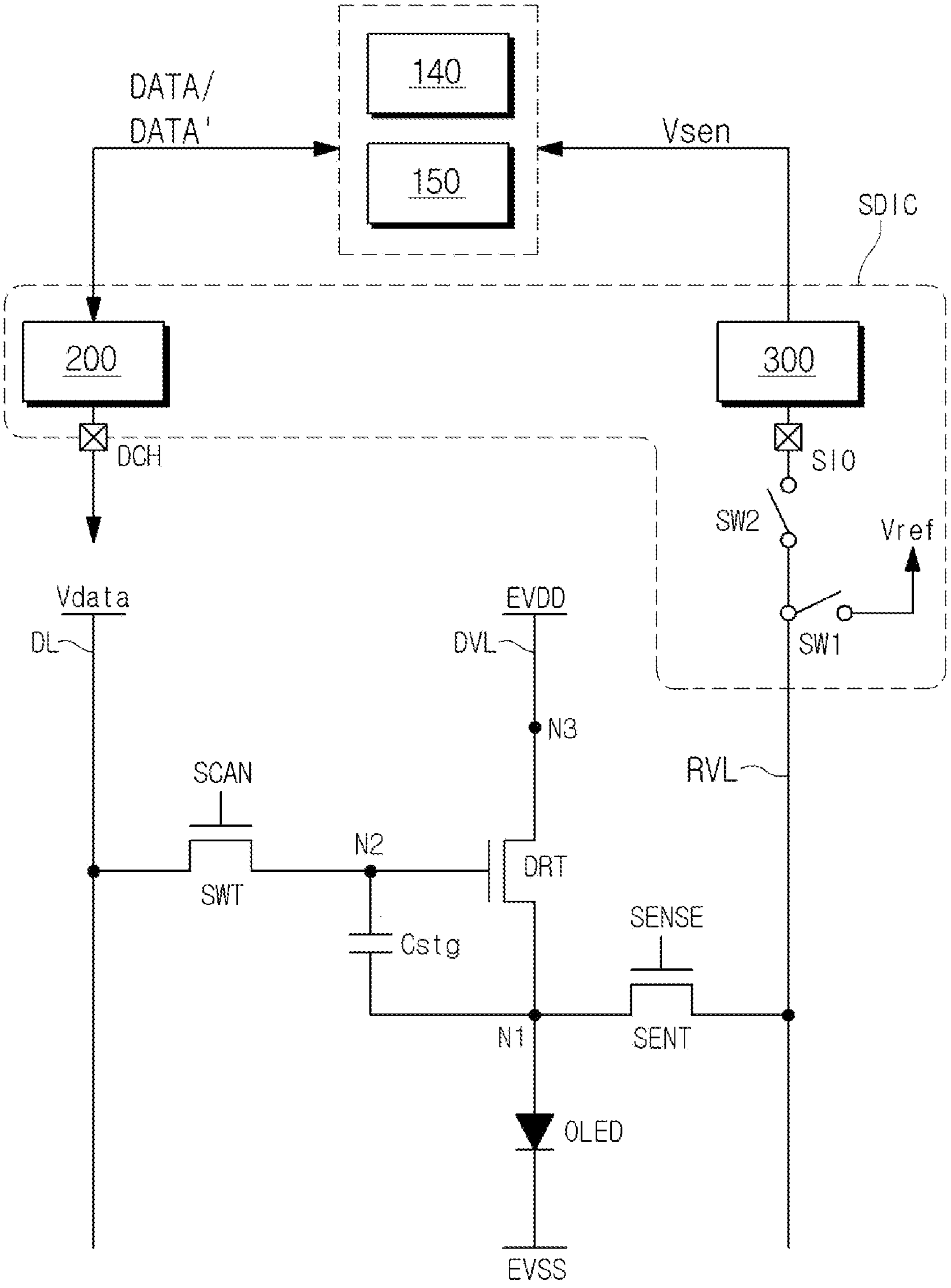
FIG. 3 is a schematic diagram illustrating a sub-pixel configuration and compensation circuitry of a display device according to another embodiment.

FIG. 3 is a schematic diagram illustrating a configuration of a sub-pixel and compensation circuitry of the display device 100 according to an embodiment.

With reference to FIG. 3, each sub-pixel arranged in the display panel 110 according to an embodiment may further include a sensing transistor SENT in addition to the organic light emitting diode OLED, the driving transistor DRT, the switching transistor SWT, and the storage capacitor Cstg, as described with respect to FIG. 2.

The sensing transistor SENT is electrically connected between the first node N1 of the driving transistor DRT and a reference voltage line RVL that supplies a reference voltage Vref and may be controlled by a sensing signal SENSE, which is a type of scan signal, applied to the gate node. The sensing transistor SENT turns on in response to the sensing signal SENSE and applies the reference voltage Vref supplied through the reference voltage line RVL to the first node N1 of the driving transistor DRT. The sensing transistor SENT may also serve as one of the voltage sensing paths for the first node N1 of the driving transistor DRT.

Meanwhile, the scan signal SCAN and the sensing signal SENSE may be separate gate signals. In this case, the scan signal SCAN and the sensing signal SENSE may be applied to the gate nodes of the switching transistor SWT and the sensing transistor SENT, respectively, through different gate lines. In another embodiment, the scan signal SCAN and the sensing signal SENSE may be the same gate signal. In this case, the scan signal SCAN and the sensing signal SENSE may be commonly applied to the gate nodes of both the switching transistor SWT and the sensing transistor SENT through the same gate line.

The driving transistor DRT, the switching transistor SWT, and the sensing transistor SENT may each be implemented as an n-type or p-type transistors.

With reference to FIG. 3, the data driver 120 according to an embodiment may include a driving circuitry 200 configured to drive sub-pixels SP and a sensing circuitry 300 configured to sense the sub-pixels SP.

The driving circuitry 200 may be connected to the data lines DL through data channels DCH and may output data voltages for driving the sub-pixels SP through the data channels DCH.

The sensing circuitry 300 is connected to the reference voltage line RVL of the sub-pixels SP through the sensing channel SIO. The sensing circuitry 300 may sense electrical signals (e.g., such as voltage) reflecting sub-pixel characteristic values (characteristic values of driving transistors and organic light-emitting diodes) or changes in the characteristic values, which are outputted from the reference voltage line RVL, convert the sensed electrical signals into digital values, and output the digital values as sensing data Vsen.

The sensing circuitry 300 may include at least one analog-to-digital converter (ADC) for converting the electrical signals inputted through the sensing channel SIO into digital data. Each ADC may be included within the source driver integrated circuit SDIC. The sensing data Vsen converted and outputted through the ADC may have a data format, e.g., low voltage differential signaling (LVDS).

The sensing circuitry 300 may include a first switch SW1 that controls the supply of a reference voltage Vref to the reference voltage line RVL for controlling sensing operation, and a second switch SW2 that switches the connection between the reference voltage line RVL and the sensing circuitry 300.

The first switch SW1 controls the connection between a power controller and the reference voltage line RVL. When the first switch SW1 is turned on, the reference voltage Vref is supplied to the reference voltage line RVL. The reference voltage Vprer supplied to the reference voltage line RVL may be applied to the first node N1 of the driving transistor DRT through the turned-on sensing transistor SENT.

Meanwhile, when the voltage at the first node N1 of the driving transistor DRT becomes a voltage state reflecting a sub-pixel characteristic value, the voltage on the reference voltage line RVL, which is equipotential to the first node N1 of the driving transistor DRT, may also become the voltage state reflecting the sub-pixel characteristic value. Here, the voltage reflecting the sub-pixel characteristic value may be charged to the line capacitor formed on the reference voltage line RVL. That is, when the sensing transistor SENT is turned on, the voltage at the first node N1 of the driving transistor DRT may be the same as the voltage of the reference voltage line, i.e., the voltage charged to the line capacitor formed on the reference voltage line RVL.

When the voltage at the first node N1 of the driving transistor DRT becomes a voltage state reflecting the sub-pixel characteristic value, the second switch SW2 is turned on, allowing the connection between the sensing circuitry 300 and the reference voltage line RVL. Consequently, the sensing circuitry 300 senses the voltage in the reference voltage line RVL, which reflects the sub-pixel characteristic value. Here, the reference voltage line RVL is also referred to as the sensing line. That is, the sensing circuitry 300 senses the voltage at the first node N1 of the driving transistor DRT.

This reference voltage line RVL may be arranged per sub-pixel column or two or more sub-pixel columns. For example, in the case where one pixel consists of four sub-pixels (red sub-pixel, white sub-pixel, green sub-pixel, blue sub-pixel), the reference voltage line RVL may be arranged with one line per pixel column containing four sub-pixel columns (red sub-pixel column, white sub-pixel column, green sub-pixel column, blue sub-pixel column).

In the case of sensing the threshold voltage of the driving transistor DRT, the voltage sensed by the sensing circuitry 300 may be a voltage value (Vdata-Vth or Vdata-ΔVth) including the threshold voltage (Vth) or threshold voltage variation (ΔVth) of the driving transistor DRT. Meanwhile, in the case of sensing the mobility of the driving transistor DRT, the voltage sensed by the sensing circuitry 300 may be a voltage value for sensing the mobility of the driving transistor DRT.

The timing controller 140 may perform a compensation process using the sensing data Vsen to compensate for sub-pixel characteristic values or characteristic value deviations and store the sensing data Vsen and/or the resultantly generated compensation values in the memory 150.

The timing controller 140 may utilize the sensing data Vsen to assess sub-pixel characteristic values (e.g., threshold voltage and mobility) of the driving transistor DRT within the sub-pixel or changes in the characteristic values (e.g., change in threshold voltage and change in mobility)

and the degradation of the organic light-emitting diodes OLED and perform a characteristic value compensation process.

The characteristic value compensation process may include a threshold voltage compensation process to compensate for threshold voltage of the driving transistors DRT, a mobility compensation process to compensate for the mobility of the driving transistors DRT, and an image retention compensation process to compensate for image retention based on the degradation degree of the organic light-emitting diode OLED. The timing controller 140 may supply the compensated video data Data' to the corresponding SDIC within the data driver 120 through the threshold voltage compensation process, mobility compensation process, or image retention compensation process. The SDIC converts the compensated video data Data' into data voltage Vdata' and supplies the converted data voltage Vdata' to the sub-pixels. The converted data voltage Vdata' may be obtained by adding a compensation voltage corresponding to the compensation value to the data voltage Vdata of the original video data. Through this, the actual compensation of sub-pixel characteristic values is achieved. The compensation values may include threshold voltage compensation values, image retention compensation values, or other types of compensation values.

Figure 4:
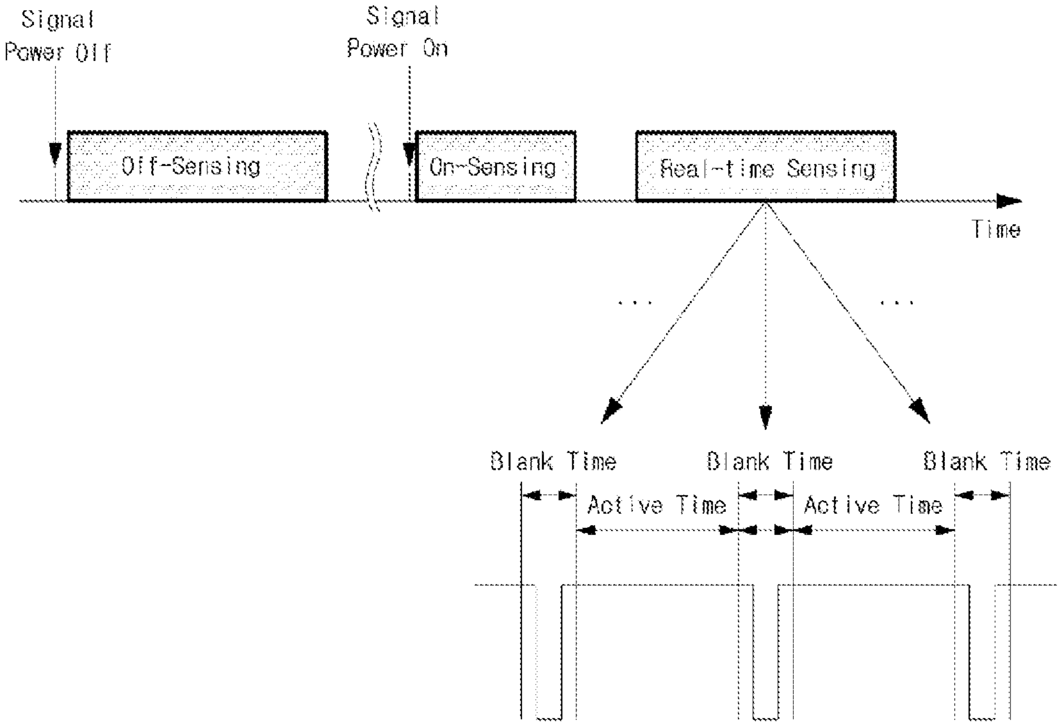
FIG. 4 is a diagram illustrating sensing timing of a display device according to an embodiment.

FIG. 4 is a diagram illustrating the sensing timing of a display device 100 according to an embodiment.

With reference to FIG. 4, the display device 100 according to an embodiment may sense the characteristic values of the circuit components within each sub-pixel arranged on the display panel 110 upon detection of a power-off signal generated in response to a user input (e.g., turning off the display device 100) or the like. This sensing process that occurs after the power-off signal is called "off-sensing."

Meanwhile, the display device 100 according to an embodiment may sense the characteristic values of circuit components within each sub-pixel upon detecting a power-on signal but before the display driving begins. This sensing process that occurs after the power-on signal but before the display driving is called "on-sensing."

Furthermore, the display device 100 according to an embodiment may sense the characteristic values of circuit components within each sub-pixel during the display driving. This sensing process that occurs during the display driving is referred to as "real-time sensing" or "RT sensing." The real-time sensing takes place at each blank time between active times, which is determined by the vertical sync signal.

Figure 5:
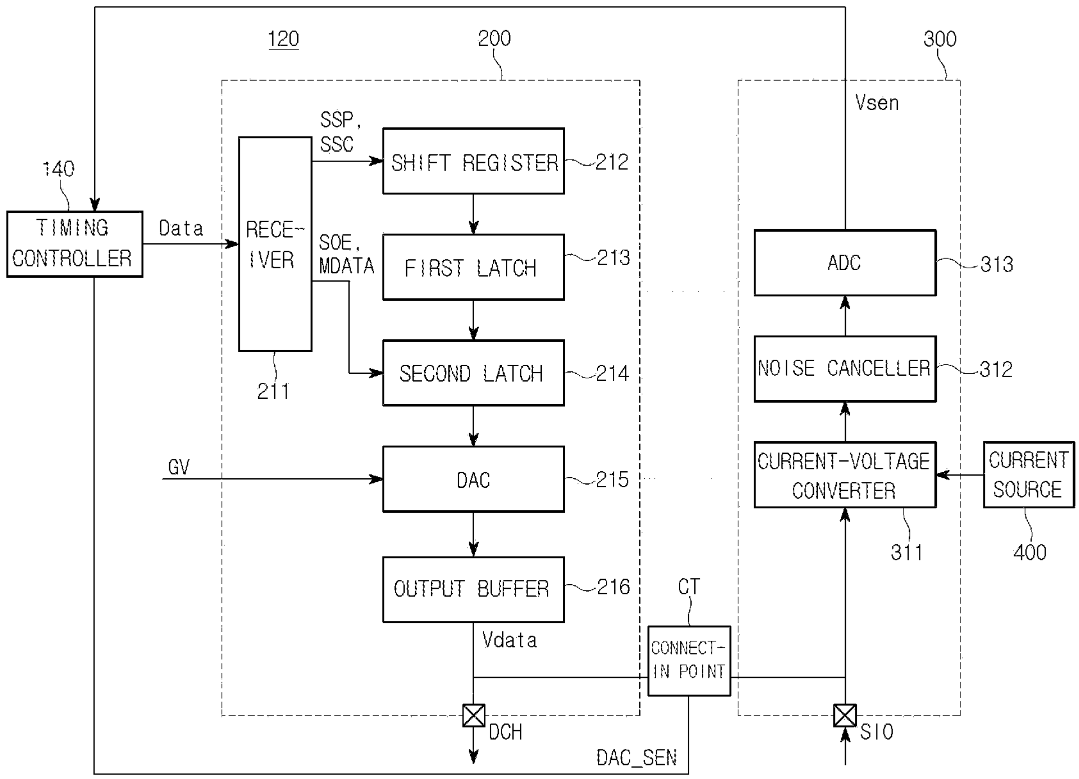
FIG. 5 is a block diagram illustrating a configuration of a data driver according to an embodiment.

FIG. 5 is a block diagram illustrating a configuration of a data driver 120 according to an embodiment.

With reference to FIG. 5, the data driver 120 includes a driving circuitry 200 and a sensing circuitry 300.

The driving circuitry 200 includes a receiver 211, a shift register 212, a first latch 213, a second latch 214, a digital-to-analog converter (DAC) 215, and an output buffer 216.

The receiver 211 (e.g., a circuit) may receive signals supplied through various interface technologies such as LVDS interface, EPI, DisplayPort (DP), or Embedded DP (eDP) interface from the timing controller 140 and recover video data Data and source control signals SSP, SSC, and SOE from the received signals for output. In an embodiment, the video data MDATA received through the receiver 211 may be the video data compensated for the gain values through pixel sensing. The source control signals may include a source start pulse signal SSP, a source sampling clock signal SSC, and a source output enable signal SOE. The source start pulse SSP is responsible for controlling the starting point of data sampling in the source drive IC. The source sampling clock SSC is a clock signal responsible for controlling the data sampling operation in the source drive IC based on the rising or falling edge. The source output enable signal SOE is responsible for controlling the output of the source drive IC.

The receiver 211 may be configured to include a serial-parallel converter. In an embodiment, the receiver 211 may receive a control packet from the timing controller 140 through the EPI interface or the like and obtain control information for the overdriving sensing drive from the control packet.

The shift register 212 may output sampling signals in response to the source start pulse SSP and source sampling clock SSC provided by the timing controller 140.

The first latch 213 sequentially latches the digital video data Data and then parallel latches the latched data for output in response to the sequentially input sampling signals from the shift register 212. The first latch 213 simultaneously outputs the video data Data sampled on one horizontal line in response to the source output enable signal SOE.

The second latch 214 latches the data input from the first latch 213 and outputs the latched video data Data simultaneously with the second latches of other DICs during the logic low period of the source output enable signal SOE. In various embodiments, there may be only one latch provided.

The DAC 215 receives gamma gradation voltages GV and converts the video data MDATA of one horizontal line into data voltages Vdata based on gamma gradation voltages GV. That is, the DAC 215 may convert the digital video data MDATA into analog data voltages Vdata. The output buffer 216 supplies the data voltage Vdata output from the DAC 215 to the data line DL through the data channel DCH according to the source output enable signal SOE.

The sensing circuitry 300 includes a current-voltage converter 311 (e.g., a circuit), a noise canceler 312 (e.g., a circuit), and an ADC 313.

The current-voltage converter 311 converts input currents input from the display panel 110 or the current source 400 through the sensing channel SIO into voltage sensing values using current integration and outputs the voltage sensing values. The noise canceler 312 cancels the noise sensed through adjacent channels from the channel-specific actual sensing values of the current-voltage converter 311 using the current source and outputs noise-canceled channel sensing values. The ADC 313 converts the channel sensing values supplied from the noise canceler 312 or the pixel sensing values bypassing the noise canceler 224 from the current-voltage converter 311 into digital data and outputs the converted data as sensing data Vsen to the timing controller 140.

Meanwhile, the current source 400 is depicted as being provided outside the data driver 120 in the illustrated embodiment, but this embodiment is not limited thereto. That is, in an alternative embodiment, the current source 400 may be within the data driver 120.

In an embodiment, the output terminal of the output buffer 216 and the input terminal of the sensing circuitry 300 may be connected through at least one connection point CT. That is, the data channel DCH and the sensing channel SIO are connected via the connection point CT. The connection point CT may be composed of one or more switching components. The connection point CT may be turned on/off based on the control signal DAC_SEN received from the timing controller 140. Hereinafter, a description is made of the connection point CT in detail.

Figure 6:
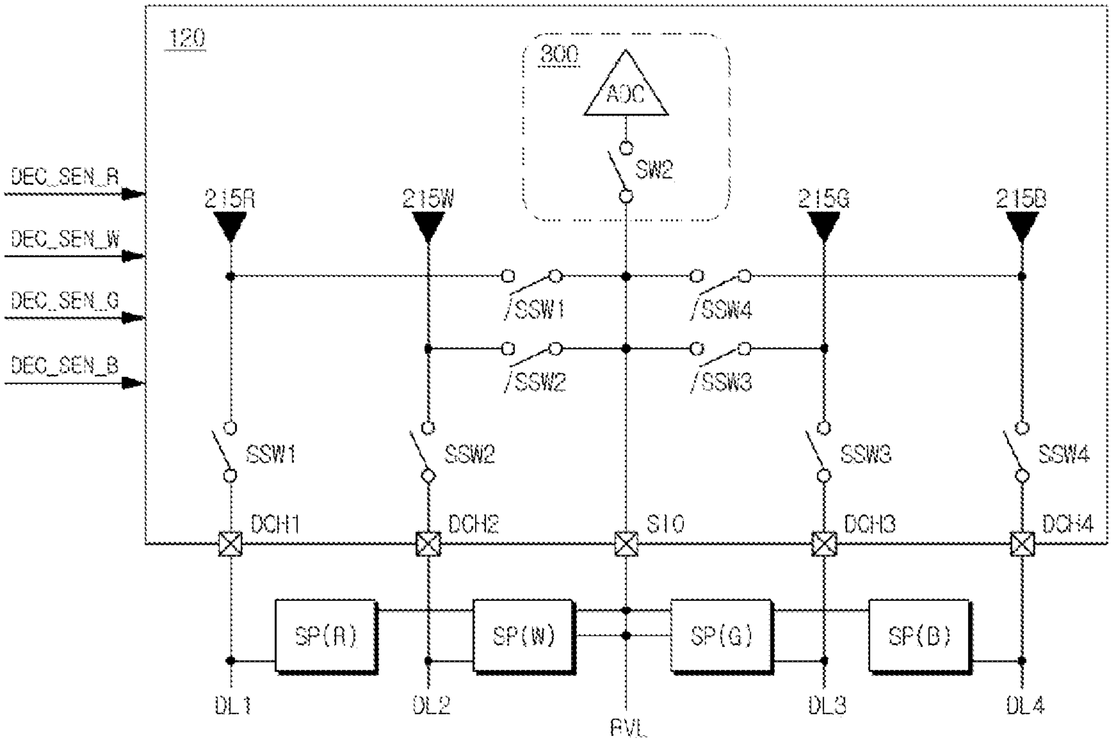
FIG. 6 is a diagram illustrating a detailed configuration of a data driver according to an embodiment.

FIG. 6 is a diagram illustrating a detailed configuration of a data driver 120 according to an embodiment.

With reference to FIG. 6, the data driver 120 according to an embodiment may include a connection switch group including connection switches SSW1 to SSW4 and an inversion switch group including inversion switches /SSW1 to /SSW4. The connection switch group SSW1 to SSW4 and the inversion switch group /SSW1 to SSW4 may be turned on or turned off depending on the switch control signal DAC_SEN received from the timing controller 140.

The control signal DAC_SEN may indicate the on/off status of the connection switch group SSW1 to SSW4 and the inversion switch group /SSW1 to /SSW4 using digital data, e.g., n-bit binary data. For example, the control signal DAC_SEN may be a 2-bit binary data of which the first bit indicates the on/off status of the connection switch group SSW1 to SSW4 and the second bit indicates the on/off status of the inversion switch group /SSW1 to /SSW4. Table 1 is an example (lookup table) of the control signal DAC_SEN expressed as a 2-bit binary data. However, this embodiment is not limited thereto.

TABLE 1

| DAC_SEN[1] | DAC_SEN[0] | Result |
|---|---|---|
| 0 | 0 | None |
| 0 | 1 | DAC Sensing |
| 1 | 0 | SOUT |
| 1 | 1 | None |

In Table 1, DAC_SEN[1] represents the value of the first bit of the 2-bit binary data, and DAC_SEN[0] represents the value of the second bit of the 2-bit binary data, "DAC Sensing" refers to the operation of turning on the inversion switch group /SSW1 to /SSW4 to perform DAC sensing, while the connection switch group is turned off and "SOUT" refers to the operation of turning on the connection switch group (SSW1 to SSW4) while the inversion switch group is off to perform characteristic value sensing. As shown in Table 1, the timing controller 140 according to an embodiment may set the first bit of the control signal DAC_SEN to '1' to indicate the turn-on of the connection switch group (SSW1 to SSW4) and set the second bit to '1' to indicate the turn on of the inversion switch group (/SSW1 to /SSW4).

During the sensing process, the timing controller 140 may provide compensated video data Data' to the driving circuitry 200 and may also turn on the inversion switch group (/SSW1 to /SSW4) through the control signal DAC_SEN to connect the output of the driving circuitry 200 to the input of the sensing circuitry 300. As a result, the output voltage Vdata' of the driving circuitry 200 for the compensated video data Data' may be sensed through the sensing circuitry 300 and transmitted to the timing controller 140.

The timing controller 140 may independently control the first to fourth inversion switches /SSW1 to /SSW4 for each color's sub-pixels SP(R), SP(W), SP(G), and SP(B). That is, the timing controller 140 may transmit independent control signals DAC_SEN_R, DAC_SEN_W, DAC_SEN_G, and DAC_SEN_B to the first to fourth inversion switches /SSW1 to /SSW4 corresponding to the color-specific sub-pixels SP(R), SP(W), SP(G), and SP(B), allowing for individual turn-on/turn-off control.

The connection switch group (SSW1 to SSW4) is positioned between the output of the driving circuitry 200, specifically the output of the DAC 215, and the data lines DL, controlling the output of the data voltage Vdata to the data lines DL. The connection switch group (SSW1 to SSW4) may include the first to fourth connection switches SSW1 to SSW4.

The first connection switch SSW1 may be connected between the DAC 215R outputting the red data voltage and the first data channel DCH1. The second connection switch SSW2 may be connected between the DAC 215W outputting the white data voltage and the second data channel DCH2. The third connection switch SSW3 may be connected between the DAC 215G outputting the green data voltage and the third data channel DCH3. The fourth connection switch SSW4 may be connected between the DAC 215B outputting the blue data voltage and the fourth data channel DCH4.

The first to fourth connection switches SSW1 to SSW4 may be controlled to turn on sequentially during the display driving period. The first to fourth connection switches SSW1 to SSW4 are turned on to transmit the data voltage output from one of the DACs 215W, 215R, 215G, and 215B (via the output buffer 216) to the data lines DL1 to DLA connected to the data channels DCH1 to DCH4.

The first to fourth connection switches SSW1 to SSW4 may be controlled to turn on within the blank time during the display driving. In this case, based on the sensing data voltage output from one of the DACs 215W, 215R, 215G, and 215B (via the output buffer 216), the characteristic values of the sub-pixel SP may be sensed.

The inversion switch group (/SSW1 to /SSW4) is connected between the output terminal of the driving circuitry 200, i.e., the output terminal of the DAC 215, and the input terminal of the sensing circuit 300, i.e., the input terminal of the ADC 313, controlling the input of the output data voltage Vdata of the driving circuitry 200 to the sensing circuit 300. The inversion switch group (/SSW1 to /SSW4) may include the first to fourth inversion switches /SSW1 to /SSW4.

The first inversion switch /SSW1 may be connected between the DAC 215R outputting the red data voltage and the sensing channel SIO. The second inversion switch /SSW2 may be connected between the DAC 215W outputting the white data voltage and the sensing channel SIO. The third inversion switch /SSW3 may be connected between the DAC 215G outputting the green data voltage and the sensing channel SIO. The fourth inversion switch /SSW4 may be connected between the DAC 215B outputting the blue data voltage and the sensing channel SIO.

The first to fourth inversion switches /SSW1 to /SSW4 may be controlled to turn on during the sensing driving. The first to fourth inversion switches /SSW1 to /SSW4 may be turned on during the off-sensing process.

The inversion switches /SSW1 to /SSW4 may be turned on to connect the data voltage Vdata output from one of the DACs 215W, 215R, 215G, and 215B (via the output buffer 216) to the sensing circuitry 300 connected to the sensing channel SIO. That is, when the first to fourth inversion switches /SSW1 to /SSW4 are turned on, the data voltage Vdata output from one of the DACs 215W, 215R, 215G, and 215B (via the output buffer 216) may be directly sensed through the sensing circuitry 300 without being output to the subpixels SP (R), SP (W), SP (G), and SP (B).

The first to fourth inversion switches /SSW1 to /SSW4 may be turned on for DAC sensing to sense the output data voltage Vdata of the DAC 215 for the video data Data input to the data driver 120. This DAC sensing may be performed to determine whether the video data Data compensated based on the result of the characteristic value sensing of the sub-pixel SP is converted into data voltage Vdata within the normal output range of the ADC. The DAC sensing may be performed during the sensing driving, e.g., during the off-sensing process.

Figure 7:
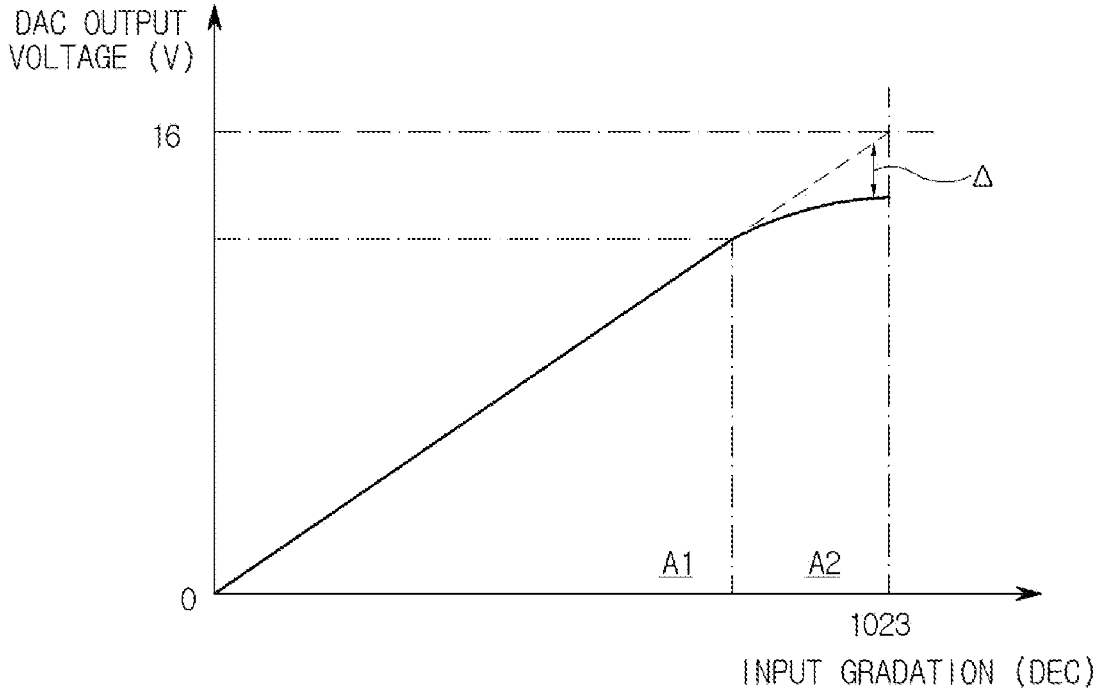
FIG. 7 is a gradation-voltage graph according to an embodiment.
Figure 8:
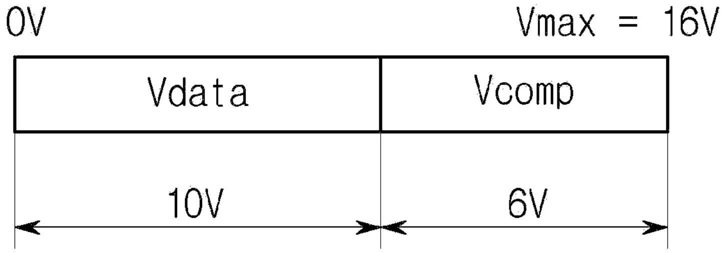
FIG. 8 is a diagram illustrating an available range of data voltages for a data driver according to an embodiment.

FIG. 7 is a gradation-voltage graph according to an embodiment. The dotted line in FIG. 7 represents the ideal output voltage of the data driver 120 based on the gradation value of the input video data, while the solid line represents the actual output voltage of the data driver 120 corresponding to the gradation value of the input video data. FIG. 8 is a diagram illustrating an available range of data voltages for a data driver.

According to an embodiment, the timing controller 140 may define a gradation-voltage graph that corresponds the output data voltage Vdata of the driving circuitry 200 to a plurality of gradation values of the video data. With reference to FIG. 7, the data voltages outputted from the data driver 120 that correspond to the plurality of gradation values may linearly increase in ideal cases, as denoted by A1, but may exhibit non-linear increase in a certain high gradation region, as denoted by A2. That is, the output data voltages Vdata output by the driving circuitry 200 may include first output data voltages associated with a linear characteristic of the output data voltages (e.g., output data voltages in A1) and second output data voltages associated with a non-linear characteristic of the output data voltages (e.g., output data voltages in A2). Consequently, the target data voltage required from the data driver 120 may not be achieved for an input gradation.

With reference to FIG. 8, the maximum drivable output voltage Vmax of the data driver 120 may be fixed. For example, the maximum output voltage Vmax may be 16 V, but is not limited thereto. Some portion of the maximum output voltage Vmax of the data driver 120 is allocated for the data voltage Vdata, while the remaining portion is allocated for compensation voltage Vcomp. For example, when the range of the output voltage allocated for the data voltage Vdata is from 0 V to 10 V, the range from 11 V to 16 V is allocated for compensation voltage Vcomp to compensate for the characteristic values of the sub-pixel SP.

In the initial driving stage of the display panel 110, where the degradation degree of circuit components is not significant, the compensated video data Data' may have gradation values within the linear increase region A1, and there may be a linear relationship between the gradation values of the compensated video data Data' and the output data voltage. However, as the driving time of the display panel 110 increases and the degradation degree of circuit components becomes significant, the compensated video data Data' may have gradation values within the non-linear increase region A2, and there may be a non-linear relationship between the gradation values of the compensated video data Data' and the output data voltage Vdata'.

As shown in FIG. 7, in the non-linear increase region A2, the output voltage of the data driver 120 may not reach the predefined target data voltage for the compensated video data Data', resulting in insufficient compensation and problems such as image quality degradation and image retention. Therefore, the display device 100 according to an embodiment may determine whether the compensated video data Data' corresponds to the non-linear increase region A2 and adjusts the compensation value to ensure sufficient compensation.

Figure 9:
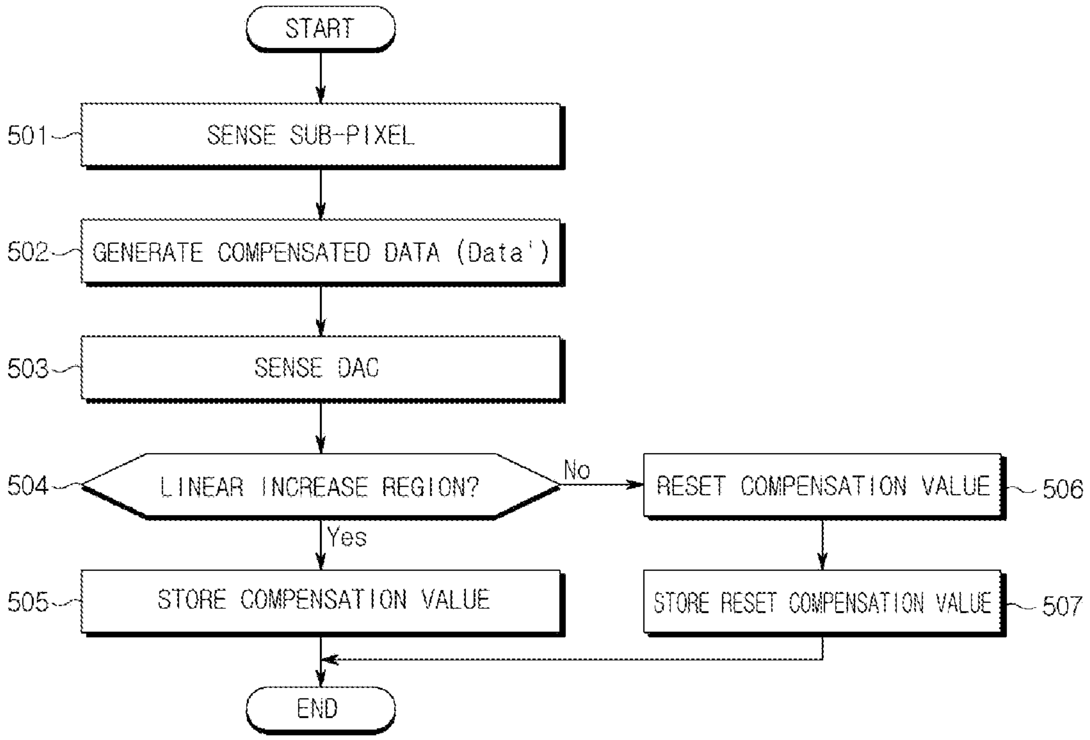
FIG. 9 is a flowchart illustrating a method of calculating a compensation value according to an embodiment.
Figure 10:
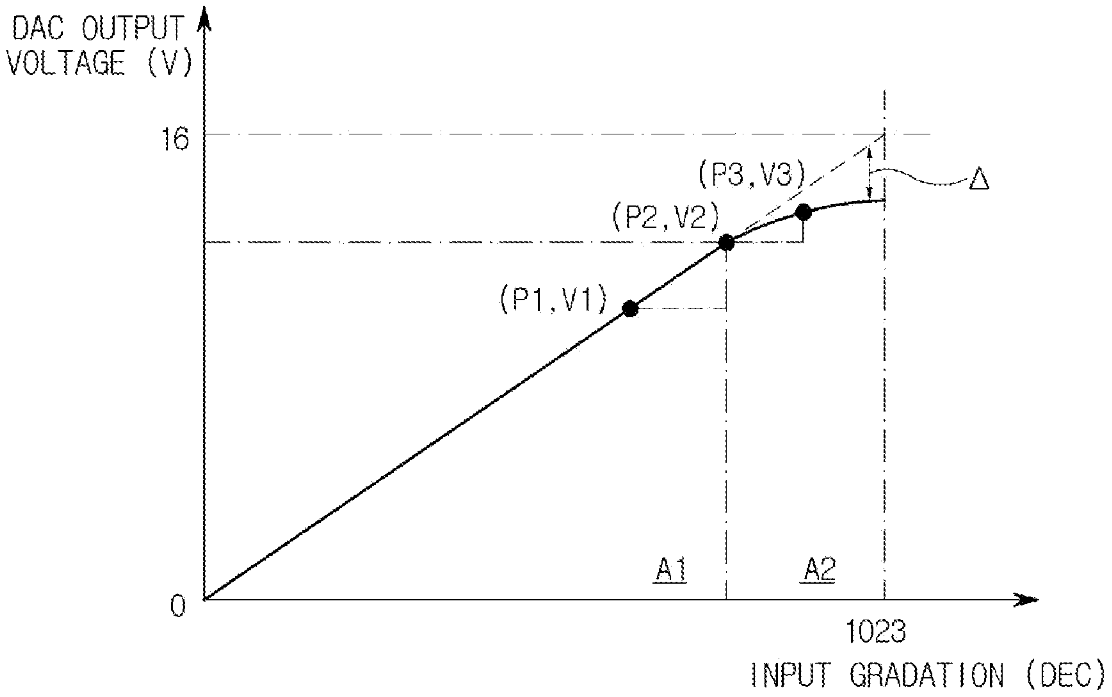
FIG. 10 is a gradation-voltage graph for explaining a compensation voltage correction method of a timing controller according to an embodiment.

FIG. 9 is a flowchart illustrating a method of calculating a compensation value according to an embodiment. FIG. 10 is a gradation-voltage graph for explaining a compensation voltage correction method of a timing controller according to an embodiment.

With reference to FIG. 9, the display device 100 according to an embodiment may sense the characteristic value of a sub-pixel SP at step 501. For example, the sensing circuitry 300 may perform a sensing process to sense the characteristic value, such as the threshold value, mobility, and degradation degree, of the sub-pixel SP, as described with reference to FIGS. 3 and 4.

The timing controller 140 of the display device 100 may generate compensated video data Data' based on the sensed characteristic values of the sub-pixel SP at step 502. The compensated video data Data' may be generated by applying compensation values determined based on the characteristic value to the original video data Data.

The timing controller 140 may transmit the compensated video data Data' to the data driver 120 to perform DAC sensing step 503. The DAC sensing may be performed to sense the compensated data voltage Vdata' actually output from the DAC 215 of the data driver 120 in correspondence to the compensated video data Data'. The DAC sensing may be performed by connecting the output terminal of the DAC 215 to the input terminal of the sensing circuitry 300, allowing the sensing circuitry 300 to perform the sensing. The DAC sensing method is described in more detail hereinafter with reference to FIG. 10.

The timing controller 140 may determine at step 504 whether the compensated video data Data' and the corresponding compensated data voltage Vdata' fall within the linear increase region A1.

With reference to FIG. 10, the timing controller 140 may determine the change in the output data voltage Vdata of the DAC 215 with respect to the change in the gradation values of a first pair of video data Data within the linear increase region A1, i.e., the slope S1 (hereinafter referred to as the first slope) of the gradation-data voltage graph. The first slope S1 may be determined based on the variation between two arbitrary gradation values P1 and P2 and the corresponding data voltages V1 and V2 within the linear increase region A1. The first slope S1 may be stored in the memory 150.

The timing controller 140 may determine the current slope of the gradation-data voltage graph S2 (hereinafter referred to as the second slope), based on the data voltage V2 for the gradation P2 of the previous (e.g., immediately previous) video data Data and the compensated data voltage (Vdata'=V3) sensed for the gradation P3 (e.g., a second pair of output data voltages) of the currently compensated video data Data'.

When the difference α between the first slope S1 and the second slope S2 is less than a predetermined threshold value, the timing controller 140 may determine that the compensated video data Data' and the corresponding compensated data voltage Vdata' fall within the linear increase region A1. On the contrary, when the difference α between the first slope S1 and the second slope S2 is equal to or greater than the predetermined threshold value, the timing controller 140 may determine that the compensated video data Data' and the corresponding compensated data voltage Vdata' fall within the non-linear increase region A2.

In another embodiment, the timing controller 140 may determine whether the output data voltage Vdata', of the DAC 215, corresponding to the compensated video data Data corresponds to the predefined target voltage based on the gradation-voltage graph. For example, the timing controller 140 may determine whether the difference α between the output data voltage Vdata' of the DAC 215 and the target voltage is greater than a predetermined threshold value.

When the difference α between the output data voltage Vdata' of the DAC 215 and the target voltage is less than the predetermined threshold value, the timing controller 140 may determine that the compensated video data Data' and the corresponding compensated data voltage Vdata' fall within the linear increase region A1. Conversely, when the difference α between the output data voltage Vdata' of the DAC 215 and the target voltage is greater than the predetermined threshold value, the timing controller 140 may determine that the compensated video data Data' and the corresponding compensated data voltage Vdata' fall within the non-linear increase region A2.

When the compensated video data Data' and the corresponding compensated data voltage Vdata' fall within the linear increase region A1, the timing controller 140 may store the predetermined compensation values in the memory 150 or the like at step 505 for use in the subsequent compensation process.

When the compensated video data Data' and the corresponding compensated data voltage Vdata' fall within the non-linear increase region A2, the timing controller 140 may reset the compensation values at step 506. That is, the timing controller 140 may correct the compensation values by the offset A of the output data voltage, which is determined by the difference between the first slope S1 and the second slope S2.

For example, the timing controller 140 may determine the target compensated data voltage Vdata' for the gradation value of the current compensated video data Data' based on the correspondence between the video data and the output data voltage within the linear increase region A1. By adding the offset α between the determined target compensated data voltage Vdata' and the sensed compensated data voltage Vdata' to the compensation values, it is possible to correct the compensation values.

In another embodiment, when the difference α between the output data voltage Vdata' of the DAC 215, which corresponds to the compensated video data Data', and the target voltage is greater than a predetermined threshold value, the timing controller 140 may add the offset α between the determined target compensated data voltage Vdata' and the sensed compensated data voltage Vdata' to the compensation values, thereby correcting compensation values.

Subsequently, the timing controller 140 may store the adjusted compensation values in memory 150 or the like at step 507 for use in the subsequent compensation process.

The display devices and driving methods thereof according to embodiments are capable of ensuring the achievement of the target data voltage required for the video data compensated by the increase of the compensation value in response to panel degradation.

The display devices and driving methods thereof according to embodiments area capable of implementing high-quality and high-resolution video by applying accurate compensation values to the video data.

Although embodiments of this disclosure have been described above with reference to the accompanying drawings, it will be understood that the technical configuration of the this disclosure described above can be implemented in other specific forms by those skilled in the art without changing the technical concept or essential features of the present disclosure. Therefore, it should be understood that the embodiments described above are exemplary and not limited in all respects. Furthermore, the scope of the present disclosure is defined by the claims set forth below, rather than the detailed description above. In addition, it should be understood that all modifications or variations derived from the meaning and scope of the claims and their equivalent concept are included within the scope of the this disclosure.

What is claimed is:

1. A display device comprising:

a display panel comprising a sub-pixel;

a data driver comprising a driving circuitry configured to output a data voltage to the sub-pixel through a data line and a sensing circuitry configured to sense a characteristic of the sub-pixel; and a timing controller configured to determine a first compensation value for video data based on the sensed characteristic of the sub-pixel, wherein the timing controller senses a first output data voltage of the driving circuitry corresponding to a first compensated video data that is compensated with the first compensation value via the sensing circuitry, and corrects the first compensation value based on the sensed output data voltage, wherein the data driver comprises:

a connection part configured to receive a control signal from the timing controller and to control a connection between an output terminal of the driving circuitry, the data line, and an input terminal of the sensing circuitry in response to the control signal, and wherein the control signal is applied at a turn-on level to sense the first output data corresponding to the first compensation data and generate a second compensation value.

2. The display device of claim 1, wherein the connection part comprises:

a connection switch configured to control a connection between the output terminal of the driving circuitry and the data line connected to the sub-pixel; and an inversion switch configured to control a connection between the output terminal of the driving circuitry and the input terminal of the sensing circuitry.

3. The display device of claim 2, wherein the timing controller transmits the first compensated video data and the control signal that turns on the inversion switch and turns off the connection switch to the data driver and senses the first output data voltage corresponding to the first compensated video data via the sensing circuitry.

4. The display device of claim 2, wherein the timing controller transmits to the data driver the control signal that turns on the connection switch and turns off the inversion switch during the sensing of the characteristic of the sub-pixel.

5. The display device of claim 2, wherein the connection switch is turned on at least once during the display driving, and the inversion switch is turned on at least once during an off-sensing process during which the first output data voltage of the driving circuitry is sensed after generation of a power-off signal.

6. The display device of claim 1, wherein the timing controller is configured to determine a first slope of a first output data voltage change between a first pair of output data voltages, determines a second slope based on a second output data voltage change corresponding to a second pair of output data voltages that includes an output data voltage from the first pair of output data voltages and the sensed first output data voltage corresponding to the first compensated video data, and corrects the first compensation value based on a difference between the first slope and the second slope responsive to the difference being greater than a predetermined threshold value.

7. The display device of claim 1, wherein the timing controller defines a gradation-voltage graph that corresponds output data voltages of the driving circuitry to gradation values of the video data, the gradation-voltage graph comprising a linear increase region in which a first portion of the output data voltages corresponding to a first portion of the gradation values increases linearly and a non-linear increase region in which a second portion of the output data voltages corresponding to a second portion of the gradation values increases non-linearly.

8. The display device of claim 7, wherein the timing controller corrects the first compensation value based on a gradation value of the first compensated video data and the sensed first output data voltage being within the non-linear increase region.

9. The display device of claim 1, wherein the first compensation value comprises a threshold voltage compensation value and an image retention compensation value of a driving transistor included in the sub-pixel.

10. The display device of claim 1, wherein the timing controller corrects the first compensation value based on a difference between the sensed first output data voltage and a target voltage predefined in correspondence to a gradation value of the first compensated video data responsive to the difference being greater than a predetermined threshold value.

11. The display device of claim 1, wherein the timing controller compensates the first compensation value based on an offset between a target voltage predefined in correspondence to a gradation value of the first compensated video data and the sensed first output voltage.

12. A driving method of a display device including a display panel including a sub-pixel, a data driver including a driving circuitry configured to output data voltage to the sub-pixel through a data line and a sensing circuitry configured to sense a characteristic of the sub-pixel, and a connection part configured to receive a control signal and to control a connection between an output terminal of the driving circuitry, the data line and an input terminal of the sensing circuitry in response to the control signal, the driving method comprising:

determining a compensation value of video data based on sensing of a characteristic of the sub-pixel;

generating first compensated video data that is compensated with the first compensation value, the first compensation value based on the sensed characteristic of the sub-pixel;

supplying the control signal to the connection part at turn-on level;

sensing a first data voltage output by the driving circuitry via the sensing circuitry, the outputted first data voltage corresponding to the first compensated video data that is compensated using the first compensation value;

generating a second compensation value by correcting the first compensation value based on the sensed output data voltage.

13. The driving method of claim 12, wherein the connection part comprises a connection switch configured to control a connection between the output terminal of the driving circuitry and the data line, and an inversion switch configured to control a connection between the output terminal of the driving circuitry and the input terminal of the sensing circuitry, wherein supplying the control signal to the connection part at turn-on level comprises:

transmitting the first compensated video data and a first control signal to the data driver, the first control signal turning on the inversion switch and turning off the connection switch to sense the first output data voltage of the driving circuitry.

14. The driving method of claim 13, further comprising:

transmitting a second control signal to the data driver, the second control signal turning on the connection switch and turning off the inversion switch during the sensing of the characteristic of the sub-pixel.

15. The driving method of claim 12, wherein correcting the first compensation value comprises:

determining a first slope of a first output data voltage change between a first pair of output data voltages;

determining a second slope based on a second output data voltage change corresponding to a second pair of output data voltages, the second pair of output data voltages including an output data voltage from the first pair of output data voltages and the outputted first data voltage that is compensated using the compensation value; and correcting the first compensation value based on a difference between the first slope and the second slope responsive to the different being greater than a predetermined threshold value.

16. The driving method of claim 12, wherein correcting the first compensation value comprises defining a gradation-voltage graph that corresponds output data voltages of the driving circuitry to gradation values of the video data, the gradation-voltage graph comprising a linear increase region in which a first portion of the output data voltages corresponding to a first portion of the gradation values increases linearly and a non-linear increase region in which a second portion of the output data voltages corresponding to a second portion of the gradation values increases non-linearly.

17. The driving method of claim 16, wherein correcting the first compensation value comprises:

correcting the first compensation value based on a gradation value of the first compensated video data and the sensed first output data voltage being within the non-linear increase region.

18. The driving method of claim 12, wherein correcting of the compensation value comprises:

comparing the sensed first output data voltage and a target voltage predefined in correspondence to a gradation value of the first compensated video data with a predetermined threshold value; and correcting the first compensation value based on a difference between the sensed first output data voltage and the predefined target voltage responsive to the difference being greater than the predetermined threshold value.

19. The driving method of claim 12, wherein correcting the first compensation value comprises:

applying an offset between a target voltage predefined in correspondence to a gradation value of the first compensated video data and the sensed first output data voltage to the first compensation value.

20. A display device comprising:

a display panel comprising a sub-pixel;

a data driver comprising a driving circuitry configured to output data voltages corresponding to video data to the sub-pixel and a sensing circuitry configured to sense a characteristic of the sub-pixel, the output data voltages including first output data voltages associated with a linear characteristic of the output data voltages and second output data voltages associated with a non-linear characteristic of the output data voltages; and a timing controller configured to determine a compensation value for the video data based on the sensed characteristic of the sub-pixel, wherein the timing controller senses an output data voltage output by the data driver and corrects the compensation value responsive to the output data voltage being included in the second output voltages associated with a non-linear characteristic of the output voltages.

21. The display device of claim 20, wherein the output data voltage output by the data driver is not received by the sub-pixel.

22. The display device of claim 20, wherein the data driver comprises:

a connection switch configured to control a connection between an output terminal of the driving circuitry and a data line connected to the sub-pixel; and an inversion switch configured to control a connection between the output terminal of the driving circuitry and an input terminal of the sensing circuitry.

23. The display device of claim 22, wherein the inversion switch is turned on and the connection switch is turned off while the timing controller senses the output data voltage.

24. The display device of claim 22, wherein the inversion switch is turned off and the connection switch is turned on while the characteristic of the sub-pixel is sensed.

* * * * *